(12) United States Patent
Jang et al.

(10) Patent No.: US 7,403,333 B2
(45) Date of Patent: Jul. 22, 2008

(54) PROJECTION TELEVISION

(75) Inventors: Hyung-sik Jang, Suwon (KR); Sang-hak Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 830 days.

(21) Appl. No.: 10/822,687

(22) Filed: Apr. 13, 2004

(65) Prior Publication Data

US 2005/0018093 A1  Jan. 27, 2005

(30) Foreign Application Priority Data

Jul. 22, 2003  (KR)  ............... 10-2003-0050319

(51) Int. Cl.
G03B 21/56 (2006.01)
(52) U.S. Cl. ..................... 359/443
(58) Field of Classification Search ........... 359/443, 359/460; 353/74, 119; 348/836, 841; 248/917
See application file for complete search history.

(56) References Cited

U.S. PATENT DOCUMENTS

| 5,580,145 | A | 12/1996 | Yamada et al. | 353/74 |
| 5,708,528 | A | 1/1998 | Furuya | 359/457 |
| 6,876,492 | B2 | 4/2005 | Utsumi et al. | 359/460 |
| 7,019,897 | B2 | 3/2006 | Takano | 359/443 |
| 7,315,417 | B2 * | 1/2008 | Chen et al. | 359/460 |

FOREIGN PATENT DOCUMENTS

| JP | 1-164438 | 11/1989 |
| JP | 4-70645 | 6/1992 |
| JP | 5-176266 | 7/1993 |
| JP | 7-56234 | 3/1995 |
| JP | 7-92564 | 4/1995 |
| JP | 10-51713 | 2/1998 |
| KR | 2000-0016763 | 3/2000 |

OTHER PUBLICATIONS

Korean Office Action for U.S. Appl. No. 10-2003-0050319 issued on Sep. 14, 2005 (3 pgs).

* cited by examiner

Primary Examiner—Christopher Mahoney
(74) Attorney, Agent, or Firm—Staas & Halsey LLP (57) ABSTRACT

A projection television including a screen providing a picture; a cover provided to a front portion of the screen; and a screen rear supporting assembly provided in rear of the screen to support a rear of the screen. The screen rear supporting assembly includes, a fixing bracket coupled with rear edge of the screen; a supporting bracket provided with an inclined rib having an inclined surface inclined along a transverse direction to a rear surface of the screen facing the rear surface of the screen to connect to a rear of the fixing bracket; and a connecting bracket to connect the supporting bracket and the fixing bracket. Thus, the present invention provides a screen rear supporting assembly of a projection television, which is assembled with ease, and a screen scratch during the assembling operation of the screen rear supporting assembly can be prevented.

23 Claims, 8 Drawing Sheets

PROJECTION TELEVISION

CROSS-REFERENCE TO RELATED APPLICATIONS

This application claims the benefit of Korean Patent Application No. 2003-50319, filed Jul. 22, 2003, in the Korean Intellectual Property Office, the disclosure of which is incorporated herein by reference.

1. Field of the Invention

The present invention relates to a projection television, more particularly, to a projection television having an improved support structure of a screen providing a picture.

2. Description of the Related Art

Generally, a projection television comprises: a Cathode Ray Tube (CRT) assembly projecting beams, a reflection mirror reflecting the projected beams, and a screen providing a picture with the reflected vides beams. The projection television further comprises: a cover provided to a front portion of the screen to form a front external appearance formed with an opening to expose the picture of the screen; a rear casing provided to a rear portion of the screen to form a rear external appearance and to support the reflection mirror and the CRT assembly, and a screen rear supporting assembly provided at a rear edge of the screen to support the screen.

Figure 8:
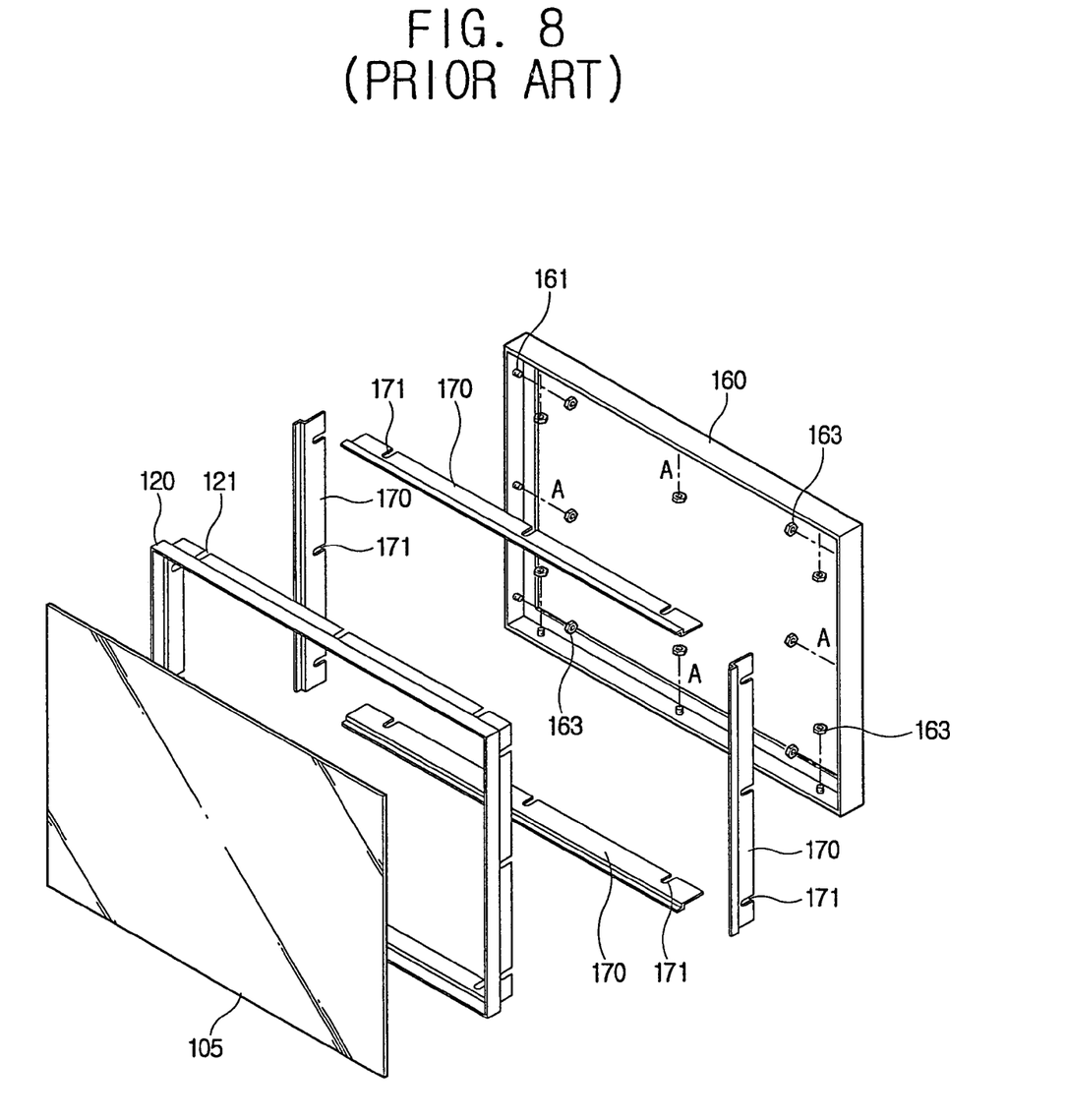
FIG. 8 is an exploded perspective view of a screen rear supporting assembly of a conventional projection television.

As shown in FIG. 8, the screen rear supporting assembly comprises: a fixing bracket 120 coupled with a rear edge of the screen 105, a supporting bracket 160 connected to a rear of the fixing bracket 120, and a plurality of connecting brackets 170 disposed around the fixing bracket 120 to connect the supporting bracket 160 and the fixing bracket 120.

The fixing bracket 120 and the connecting bracket 170 are provided with coaxially formed first and second connecting holes 121 and 171, respectively, and the supporting bracket 160 is provided with protrusions 161 to allow insertion of the first and second connecting holes 121 and 171 along the circumference of the supporting bracket 160.

According to the above configuration, the screen rear supporting assembly supporting the rear of the screen 105 is assembled as follows.

First, the fixing bracket 120 that is supplied with adhesives is coupled with the rear edge of the screen 105, and the protrusions 161 of the supporting bracket 160 are inserted into the first connecting hole 121 formed on the fixing bracket 120 that is connected to the rear edge of the screen 105. Then, the plurality of connecting brackets 170 are disposed around the circumference of the fixing bracket 120. Further, the protrusions 161 of the supporting bracket 160 inserted into the first connecting hole 121 of the fixing bracket 120 are coupled with the second connecting hole 171 of the connecting bracket 170. Thereafter, the protrusions 161 are inserted into nuts 163, thereby, providing the screen rear supporting assembly.

However, according to the above conventional assembly process shown in FIG. 8, the coupling direction of the protrusions 161 to the nuts 163 is transverse to each of the sides of the supporting bracket 160, i.e., in the direction of an arrow A in FIG. 8. Thus, the protrusions 161 are inserted into the nuts 163 within the vicinity of the screen 105, making the screen susceptible to scratching likely to occur while performing a task around the area in close proximity to the screen, by a wrench, etc. Further, the first and second connecting holes 121 and 171 are approximately U shaped, and provide insufficient support to the combination of the fixing bracket 120 and the supporting bracket 160. Thus, when the protrusions 161 are inserted into the nuts 163, the supporting bracket 160 may be separated from the fixing bracket 120, thereby, making re-insertion of the protrusions 161 into the nuts 163 difficult.

SUMMARY OF THE INVENTION

Accordingly, it is an aspect of the present invention to provide a projection television having a screen rear supporting assembly that can be assembled with ease, and to prevent screen scratching during assembly of the screen rear supporting assembly.

The foregoing and/or other aspects of the present invention are also achieved by providing a projection television comprising: a screen to provide a picture; a cover provided to a front portion of the screen; and a screen rear supporting assembly provided to a rear portion of the screen to support the rear of the screen. The screen rear supporting assembly further comprises: a fixing bracket coupled with a rear edge of the screen; a supporting bracket provided with an inclined rib having an inclined surface inclined along a transverse direction to a rear surface of the screen and facing the rear surface of the screen to connect to a rear portion of the fixing bracket; and a connecting bracket to connect the supporting bracket and the fixing bracket.

According to an aspect of the invention, the supporting bracket further comprises: a first supporter disposed approximately parallel to a surface of the screen; and a second supporter bent in a transverse direction to the surface of the first supporter, where the inclined rib protrudes from an inner surface of the second supporter.

Additional aspects and advantages of the invention will be set forth in part in the description which follows and, in part, will be obvious from the description, or may be learned by practice of the invention.

According to an aspect of the invention, the inclined rib is of an approximately triangular section.

According to another aspect of the invention, the connecting bracket comprises: a contacting part to contact with the inclined surface of the inclined rib; and a connecting part bent from the contacting part towards a transverse direction to the surface of the second supporter.

According to an aspect of the invention, an inserting slit is formed along a lengthwise direction of the inclined surface of the inclined rib, and the fixing bracket comprises: a coupling part coupled with the rear edge of the screen; a groove extending from the coupling part at an inclined angle corresponding to the inclined surface of the inclined rib and disposed between the contacting part and the inclined surface of the inclined rib; and an inserting part bent from an edge of the groove to be inserted into the inserting slit.

According to an aspect of the invention, the inclined rib is formed with a first screw hole to be coupled with a screw, and the connecting part is formed with a second screw hole placed coaxially with the first screw hole.

According to an aspect of the invention, the first supporter of the supporting bracket is formed with a screwdriver inserting hole placed corresponding to the first screw hole to allow a screwdriver to pass therethrough, where the screwdriver is inserted to perform various operations, such as to turn the screw inserted in the first screw hole and the second screw hole.

According to an aspect of the invention, a connecting protrusion is formed on one of the inclined rib and the connecting bracket, and a connecting protrusion accommodating groove is formed on the other of the inclined rib and the connecting bracket.

BRIEF DESCRIPTION OF THE DRAWINGS

The above and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout.

Figure 1:
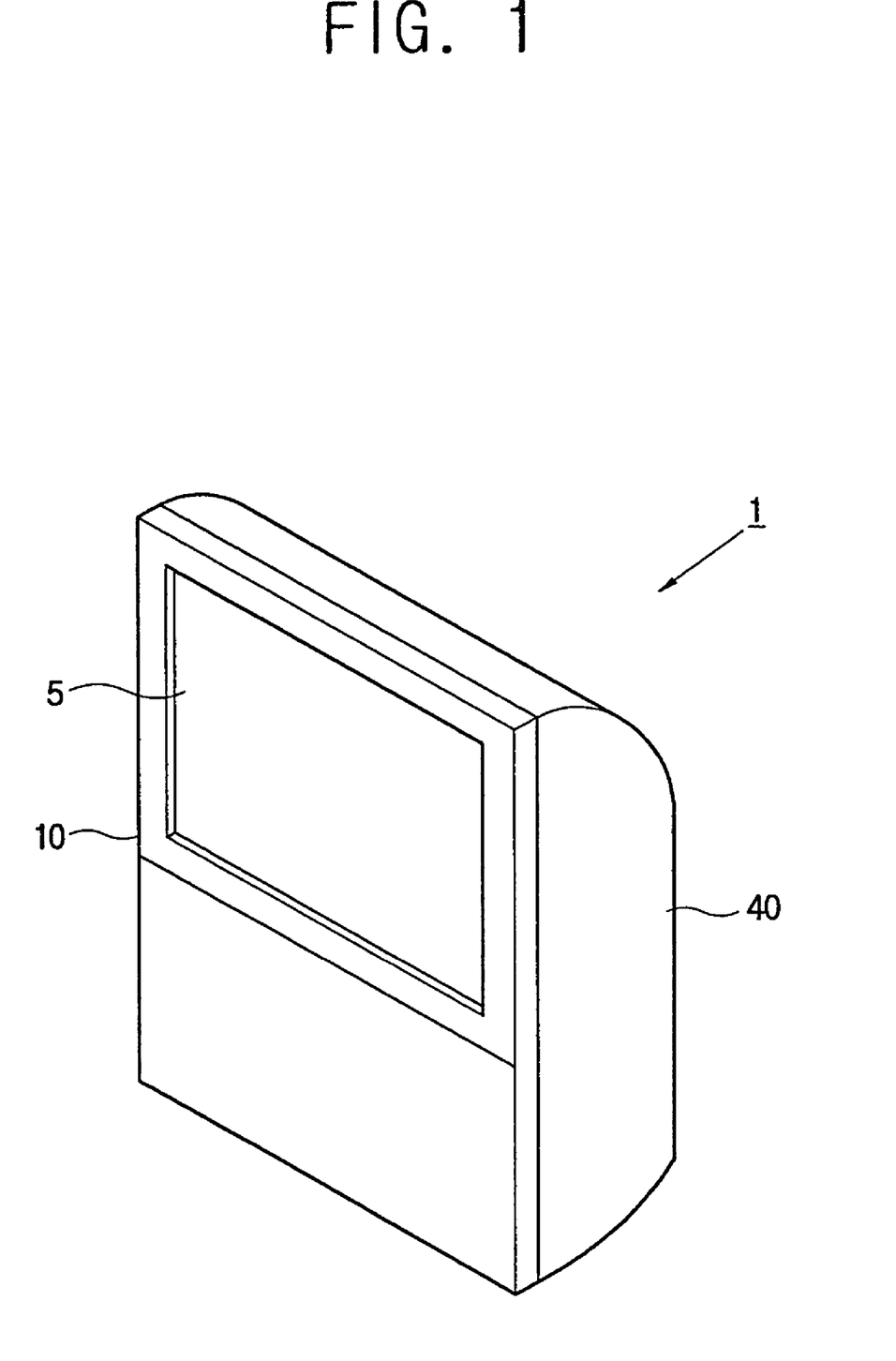
FIG. 1 is a perspective view of a projection television according to an aspect of the present invention.

As shown in FIG. 1, a projection television 1 according to an aspect of the present invention comprises: a screen 5 to provide a picture, a cover 10 provided to a front edge of the screen 5, and a rear casing 40. As illustrated in FIG. 3, the projection television 1 further comprises: a screen rear supporting assembly 30 provided to the rear of the cover 10 shown in FIG. 1 to support a rear of the screen 5, and as illustrated in FIG. 2, the projection television also comprises: a CRT assembly 50 to project beams, a reflection mirror 41 to reflect the projected beams towards a rear surface of the screen 5, and a rear casing 40 provided to rear of the screen 5 to support the CRT assembly 50 and the reflection mirror 41.

The screen 5 is shaped similar to a plate and provides a picture through the beams reflected via the reflection mirror 41 provided towards the rear of the screen 5. The screen 5 comprises: a pair of picture forming seats including a Lenticular lens seat or a Fresnel lens seat forming a picture through the beams reflected from the reflection mirror 41, and a protecting seat such as a Sun screen provided to a front of the picture forming seat to prevent a reflection of light towards the picture forming seat. A manufacturing method of the picture forming seat and an improvement of the quality of the picture may vary the thickness of the screen 5, and the thickness of the screen 5 in turn may bring variation to the thickness of the picture forming seat and determine whether the protecting seat is mounted.

Figure 2:
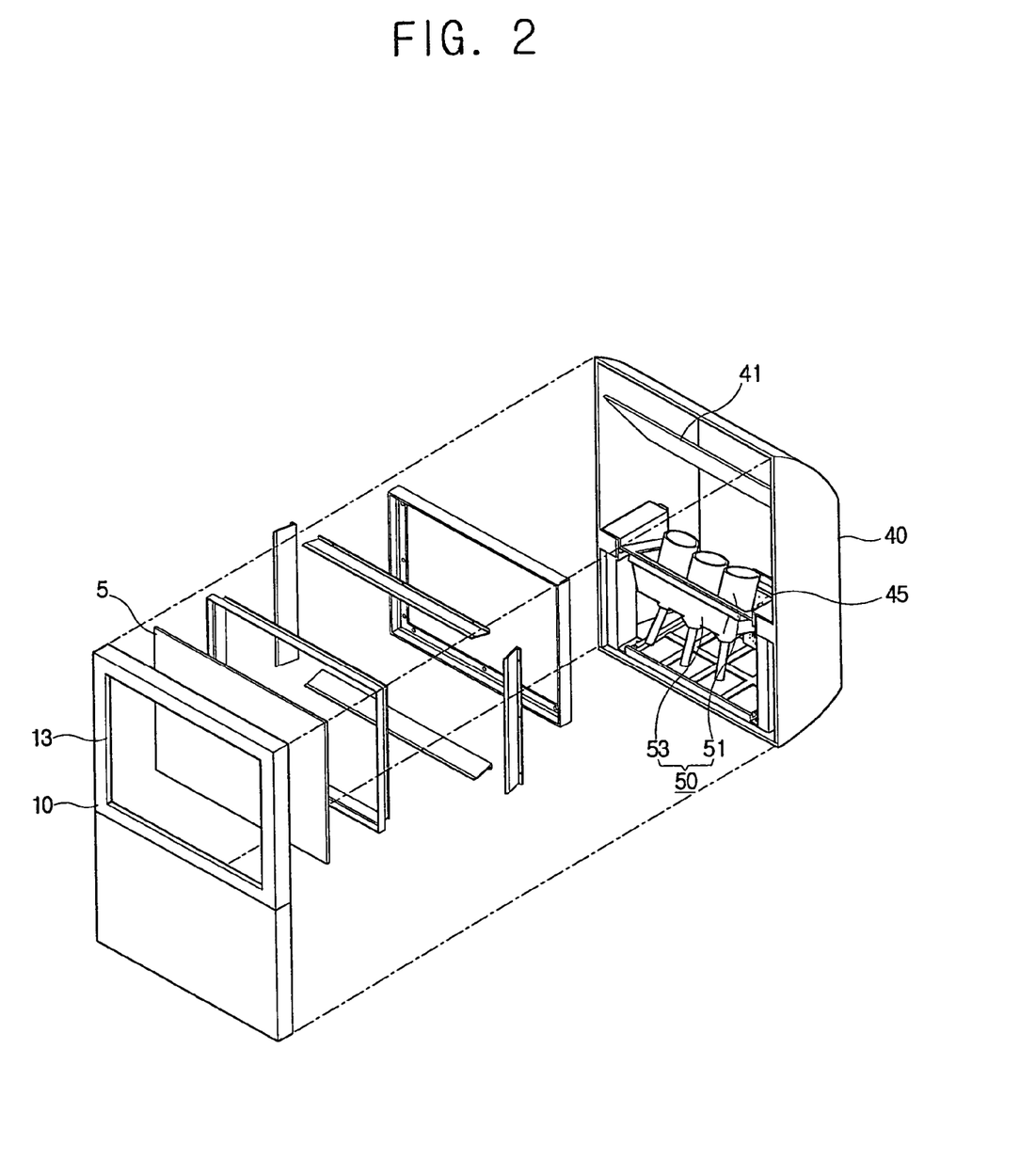
FIG. 2 is an exploded perspective view of the projection television of FIG. 1.
Figure 3:
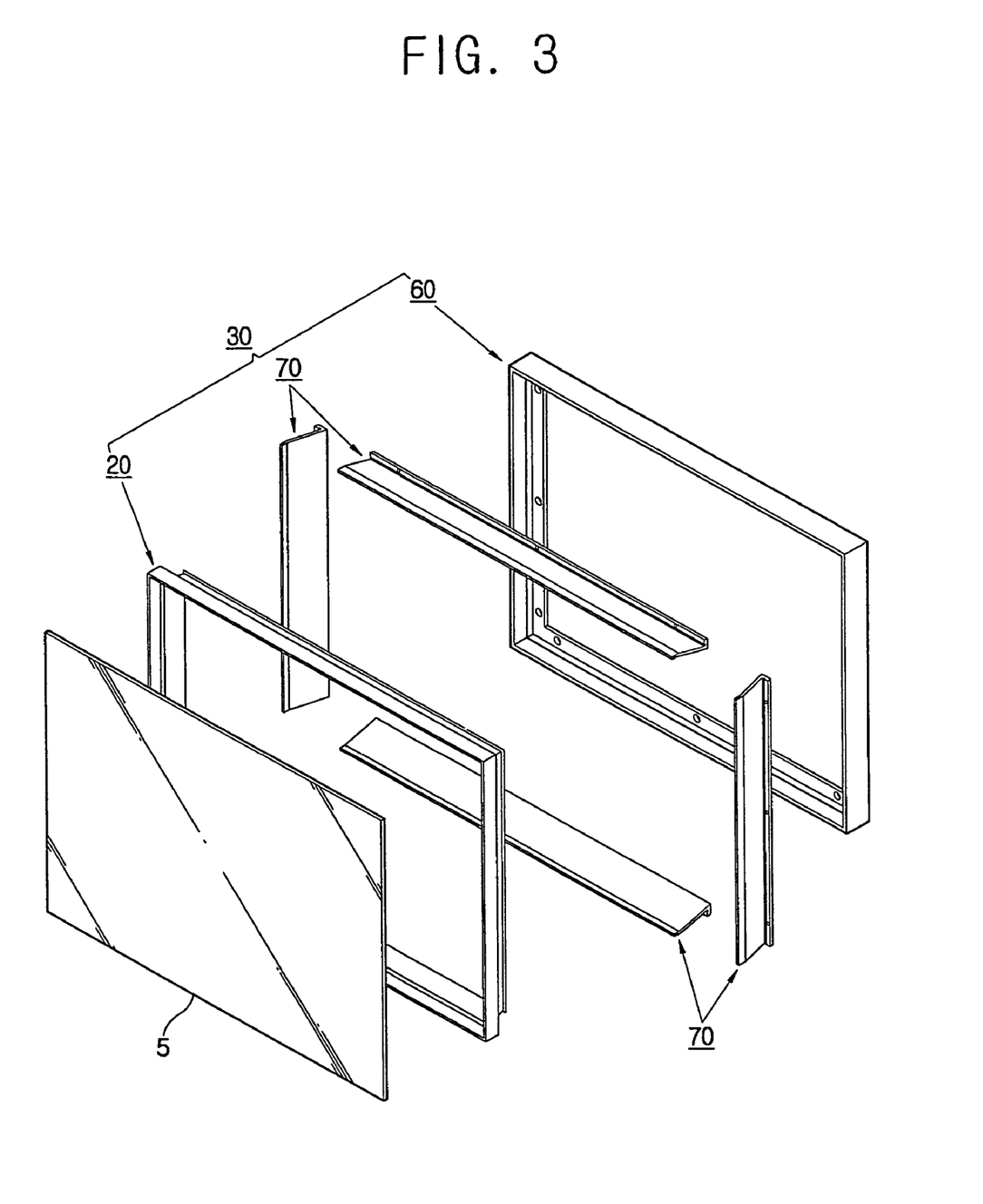
FIG. 3 is an exploded perspective view of a screen rear supporting assembly of FIG. 2.

As shown in FIG. 2, the cover 10 forms a front external appearance of the projection television 1, and is formed with an opening 13 to provide for the picture of the screen 5.

The rear casing 40 forms a rear and a side external appearances of the projection television 1. The front of the rear casing 40 is connected to the cover 10 by screws or other combining elements and/or techniques. Further, towards a lower part inside the rear casing 40 is disposed the CRT assembly 50 to project beams to form the picture; the reflection mirror 41 is provided at an incline towards an upper part of the rear casing 40 to reflect the beams projected from the CRT assembly 50 towards the screen 5; and towards a bottom part of the rear casing 40 is provided a printed circuit substrate 45 to control the CRT assembly 50 and the like.

The CRT assembly 50 comprises a plurality of CRTs 51 projecting beams and a CRT frame 53 to support the plurality of CRTs 51. The CRT assembly 50, which forms an angle at which the CRT assembly 50 can project the beams to the reflection mirror 41, is connected to the lower part of the rear casing 40.

The screen rear supporting assembly 30, shown in FIG. 3, is provided between the rear casing 40 and the cover 10 to support the rear of the screen 5. The screen rear supporting assembly 30 comprises: a fixing bracket 20 coupled with rear edge of the screen 5, a supporting bracket 60 connected to a rear of the fixing bracket 20, and a plurality of connecting brackets 70 disposed around the fixing bracket 20 to connect the supporting bracket 60 and the fixing bracket 20.

Figure 5:
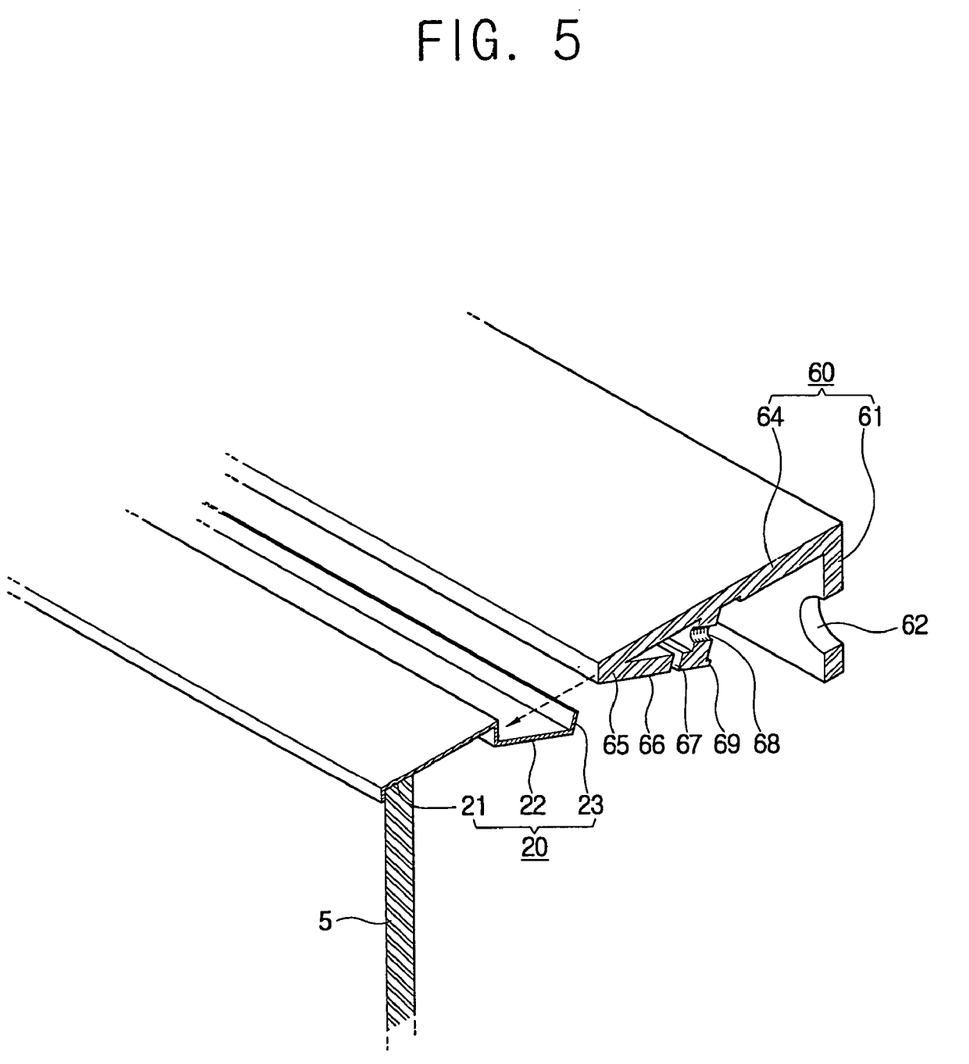

As shown in FIG. 5, the supporting bracket 60 comprises: a first supporter 61 disposed approximately parallel to a surface of the screen 5, a second supporter 64 bent in a transverse direction to the surface of the first supporter 61, and an inclined rib 65 protruding from an inner surface of the second supporter 64.

The inclined rib 65 is of an approximately triangular section and comprises: an inclined surface 66 inclined along a transverse direction to a rear surface of the screen 5 facing the rear surface of the screen 5, an inserting slit 67 formed along a lengthwise direction to allow insertion of an inserting part 23 (to be described later) of the fixing bracket 20 therein, a first screw hole 68 through a surface of the inclined rib 65 facing the first supporter 61 to be coupled with a screw 63, and a connecting protrusion 69 spaced apart from the first screw hole 68 to be inserted in a connecting protrusion accommodating groove 74 of a connecting bracket 70 (to be described later).

The first supporter 61 is formed with a screwdriver inserting hole 62 placed corresponding to the first screw hole 68 to guide a screwdriver therein, the screwdriver is to turn the screw 63 and insert it 63 in the first screw hole 68 and a second screw hole 73 (to be described later). Thus, the screw 63 can be inserted through the screwdriver inserting hole 62 in the first and second screw holes 68 and 73. That is, one can insert the screwdriver into the screwdriver inserting hole 62, and can turn the screw 63 via the screwdriver.

The connecting bracket 70 comprises: a contacting part 71 to contact with the inclined surface 66 of the inclined rib 65 and a connecting part 72 bent from the contacting part 71 towards a transverse direction to a surface of the second supporter 64. The connecting part 72 is formed with the second screw hole 73 placed coaxially with the first screw hole 68. The area where the contacting part 71 and the connecting part 72 are in contact is formed with a connecting protrusion accommodating groove 74 along a lengthwise direction, into which the protrusion 69 of the inclined rib 65 is inserted.

Figure 4:
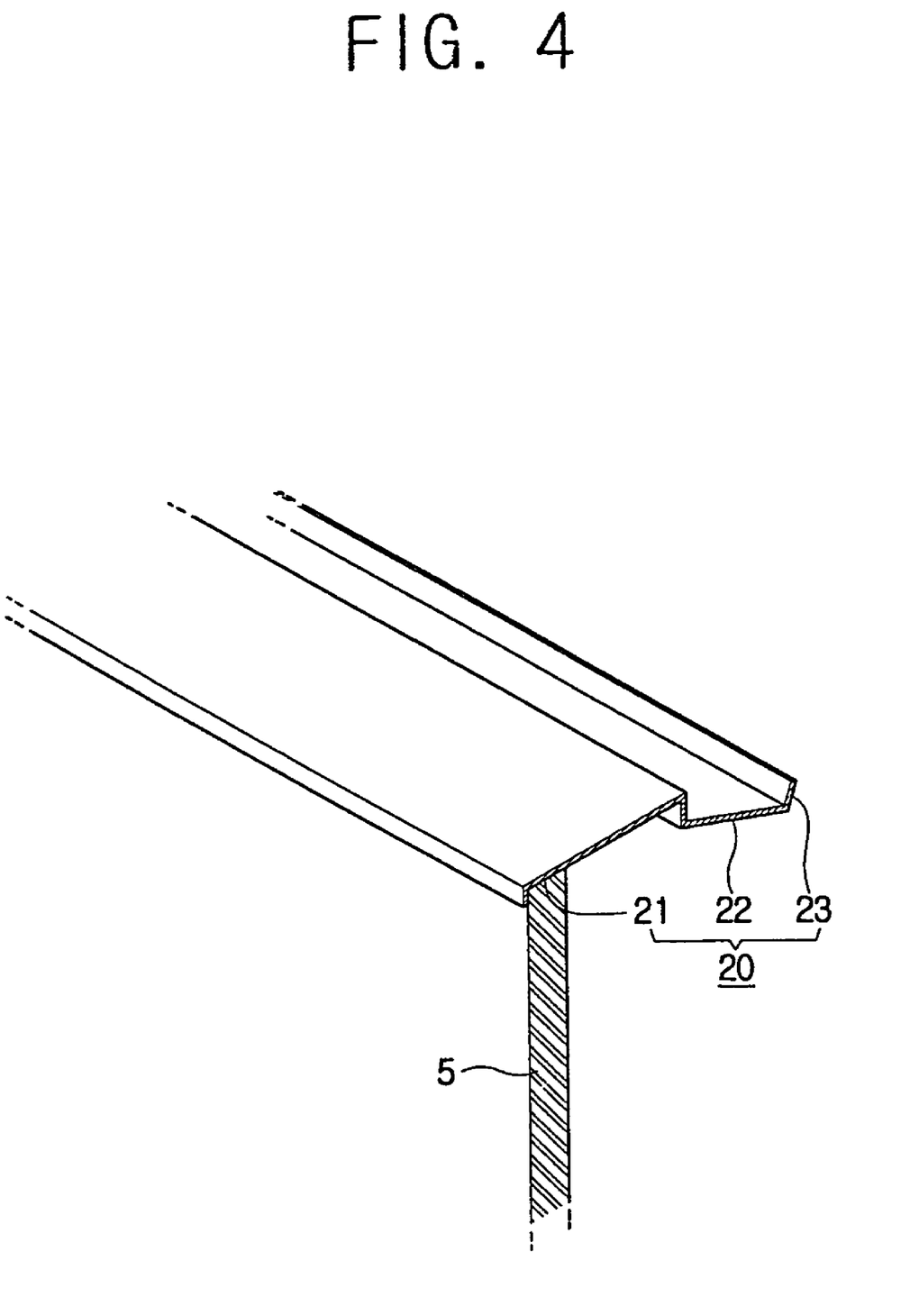
FIGS. 4 through 7 show an assembling process of the screen rear supporting assembly along the lines shown in FIG. 2.
Figure 6:
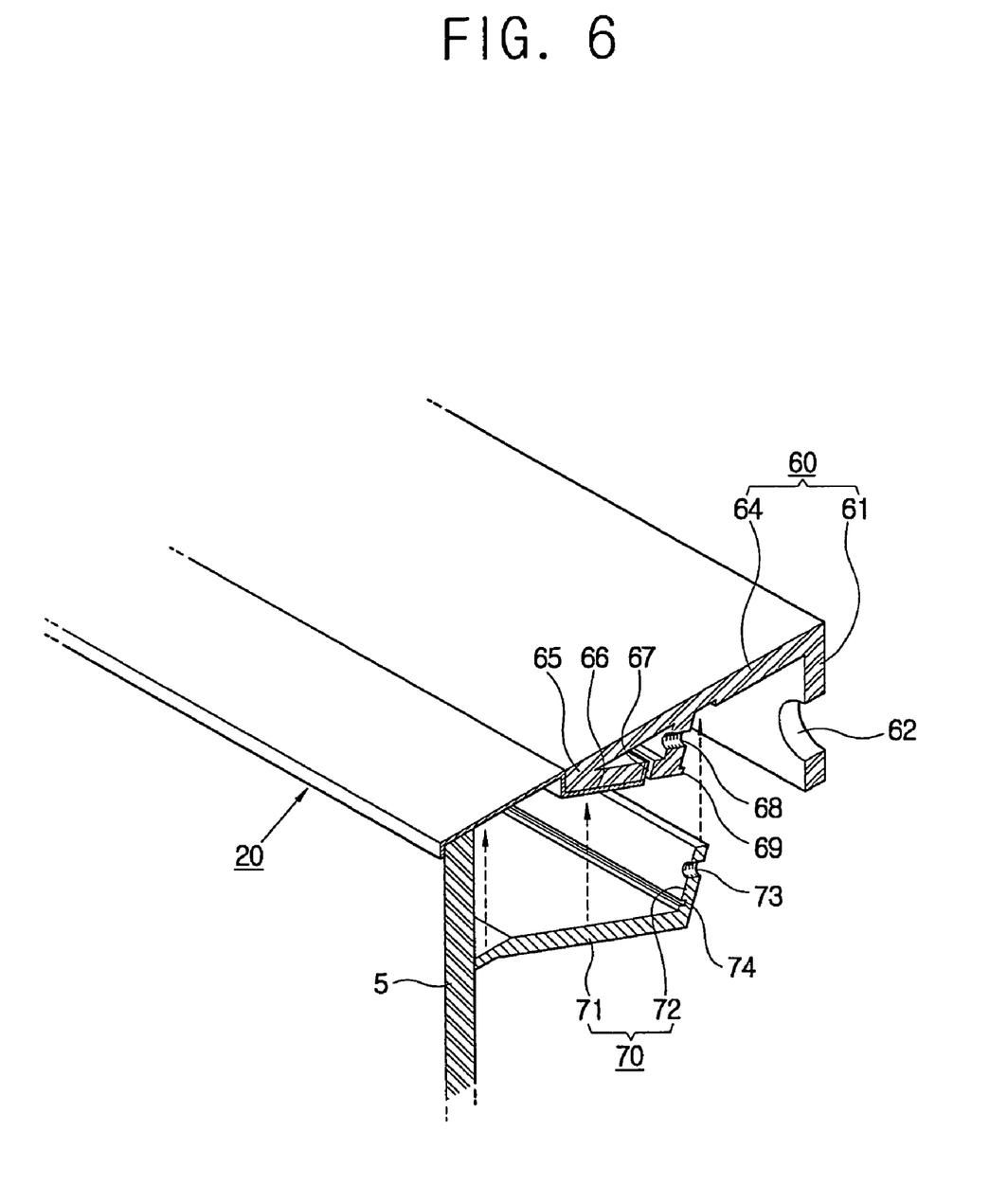

As shown in FIG. 4 and FIG. 6, the fixing bracket 20 comprises: a coupling part 21 coupled with the rear edge of the screen via adhesives, a groove 22 provided at an incline extending from the coupling part 21 at an inclined angle corresponding to the inclined surface 66 of the inclined rib 65 and disposed between the contacting part 71 of the connecting bracket 70 and the inclined surface 66 of the inclined rib 5, and an inserting part 23 bent from an edge of the groove 22 to be inserted in the inserting slit 67 of the inclined rib 65.

According to the above configuration, the screen 5 and the screen rear supporting assembly 30 of the projection television 1 according to an aspect of the present invention are assembled as follows (refer to FIGS. 4 through 7).

The coupling part 21 of the fixing bracket 20, which is supplied with adhesives, is coupled with the edge of the rear of the screen 5, thereby, fixedly connecting the screen 5 and the fixing bracket 20 (refer to FIG. 4). Then, as shown in FIG.

5, a rear of the fixing bracket 20 coupled with the screen 5 is connected to the supporting bracket 60. Here, the groove 22 of the fixing bracket 20 is bent by some tension, so that the inserting part 23 is inserted into the inserting slit 67 of the inclined rib 65 formed in the supporting bracket 60. Thus, as shown in FIG. 6, the inclined rib 65 of the supporting bracket 60 is seated on the groove 22.

Figure 7:
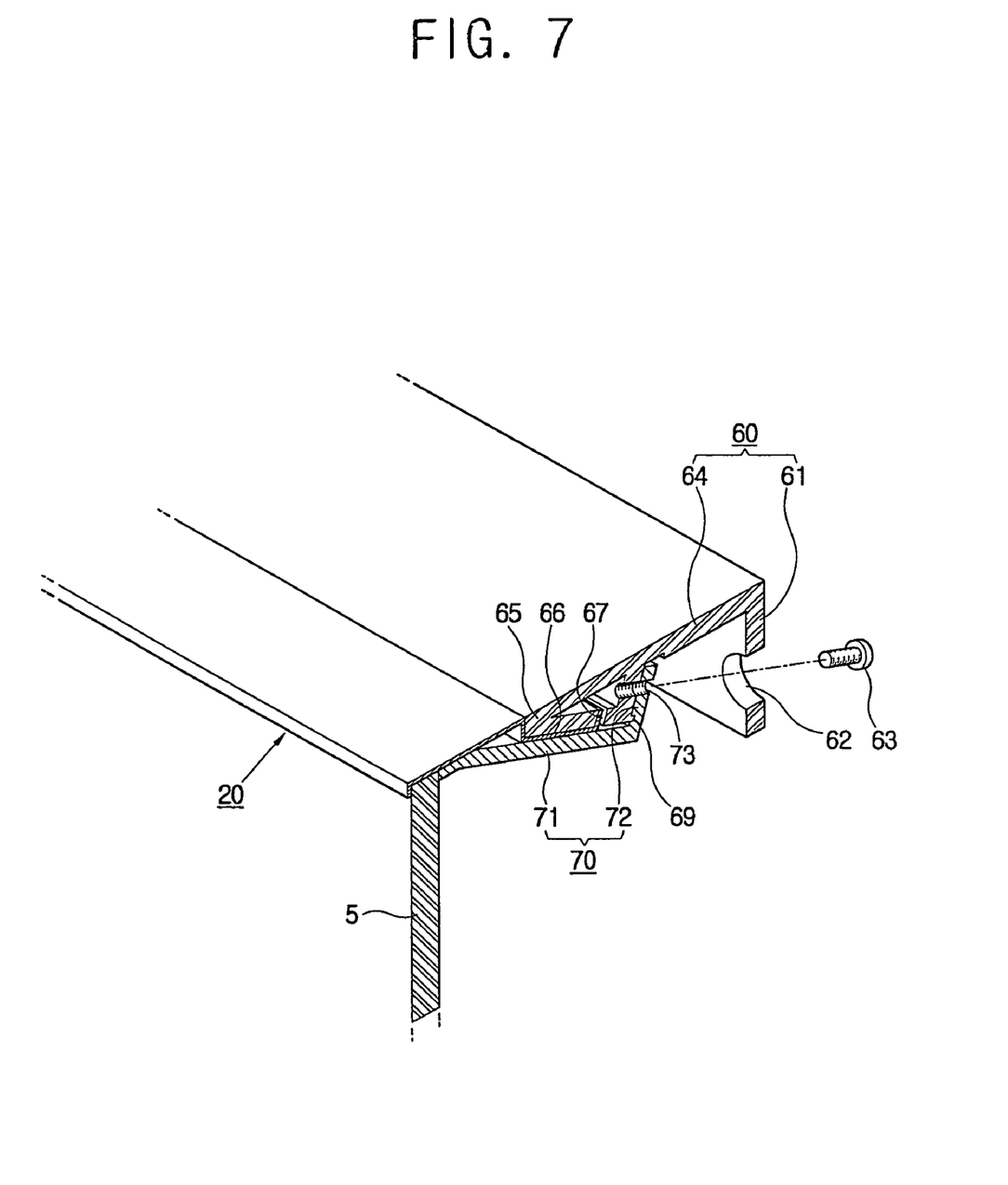

As shown in FIG. 6, to securely connect the fixing bracket 20 to the supporting bracket 60, the plurality of connecting brackets 70 are connected to each other around the screen 5. Here, the connecting protrusion 69 of the inclined rib 65 is inserted into the connecting protrusion accommodating groove 74 of the connecting bracket 70, so that first screw hole 68 of the inclined rib 65 and the second screw hole 73 of the connecting bracket 70 are placed on a coaxial line. Then, the fixing bracket 20 and the supporting bracket 60 are fixedly connected and the connection is supported by an engagement of the connecting protrusion 69 and the connecting protrusion accommodating groove 74. As shown in FIG. 7, according to the above stated aspects of the invention, a user can insert a screwdriver into the screwdriver inserting hole 62 formed on the first supporter 62 of the supporting bracket 60, and can also insert the screw in the first and second screw holes 68 and 73 with the screwdriver.

According to the projection television 1 of an aspect of the present invention, the inclined rib 65 is formed in accordance with a direction of insertion of the screwdriver, and the inclined rib 65 prevents the screwdriver from moving forward to the screen 5. Thus, unlike the conventional projection television, the screw 63 is inserted into the screw holes 68 and 73 via the screwdriver spaced from the screen 5, so that a screen scratch due to the screwdriver is prevented. Further, after the connection of the fixing bracket 20 and the supporting bracket 60 is supported, the screw is inserted into the screw holes 68 and 73, so that the supporting bracket 60 is not separated from the fixing bracket 20. Thus, the screw is inserted in the screw holes 68 and 73 with more ease than in the conventional projection television.

According to an aspect of the present invention as described in FIG. 6, the connecting protrusion 69 is provided on the inclined rib 65 and the connecting protrusion accommodating groove 74 is formed in the connecting bracket 70. However, the connecting protrusion may be provided on the connecting bracket and the connecting protrusion accommodating groove may be formed in the inclined rib.

As described above, a projection television where the screen rear supporting assembly can be assembled with ease, and a screen scratch during the assembly of the screen rear supporting assembly can be prevented.

Although a few embodiments of the present invention have been shown and described, it will be appreciated by those skilled in the art that changes may be made in these embodiments without departing from the principles and spirit of the invention, the scope of which is defined in the appended

What is claimed is:

1. A projection television having a screen to provide a picture, comprising:
    a cover provided to a front portion of the screen; and
    a screen rear supporting assembly provided to a rear portion of the screen to support the rear of the screen, the screen rear supporting assembly comprising:
    a fixing bracket coupled with an edge of the rear of the screen,
    a supporting bracket provided with an inclined rib having an inclined surface inclined along a transverse direction to a rear surface of the screen and facing the rear surface of the screen, the inclined rib being seated on a rear of the fixing bracket, and
    a connecting bracket to connect the supporting bracket and the fixing bracket.

2. The projection television according to claim 1, wherein the supporting bracket further comprises:
    a first supporter disposed approximately parallel to a surface of the screen; and
    a second supporter bent in a transverse direction to the surface of the first supporter, and the inclined rib protruding from an inner surface of the second supporter.

3. The projection television according to claim 2, wherein the inclined rib is of an approximately triangular section.

4. The projection television according to claim 3, wherein the connecting bracket further comprises:
    a contacting part to contact with the inclined surface of the inclined rib; and
    a connecting part bent from the contacting part towards a transverse direction to a surface of the second supporter.

5. The projection television according to claim 4, wherein the supporting bracket further comprises:
    an inserting slit formed along a lengthwise direction of the inclined surface of the inclined rib; and
    the fixing bracket further comprises:
    a coupling part to coupled with the edge of the rear of the screen,
    a groove extending from the coupling part at an inclined angle corresponding to the inclined surface of the inclined rib disposed between the contacting part and the inclined surface of the inclined rib, and
    an inserting part bent from an edge of the groove to be inserted into the inserting slit.

6. The projection television according to claim 5, wherein the first supporter of the supporting bracket further comprises:
    a screwdriver inserting hole placed to correspond to the first screw hole to allow a screwdriver to pass therethrough.

7. The projection television according to claim 6, wherein further comprising:
    a connecting protrusion formed on one of the inclined rib and the connecting bracket; and
    a connecting protrusion accommodating groove formed on the other of the inclined rib and the connecting bracket.

8. The projection television according to claim 2, wherein the connecting bracket further comprises:
    a contacting part to contact with the inclined surface of the inclined rib; and
    a connecting part bent from the contacting part towards a transverse direction to the surface of the second supporter.

9. The projection television according to claim 8, further comprising:
    an inserting slit formed along a lengthwise direction of the inclined surface of the inclined rib.

10. The projection television according to claim 9, wherein the fixing bracket further comprises:
    a coupling part coupled with the rear edge of the screen;
    a groove extending from the coupling part at an inclined angle corresponding to the inclined surface of the inclined rib disposed between the contacting part and the inclined surface of the inclined rib; and
    an inserting part bent from an edge of the groove to be inserted into the inserting slit.

11. The projection television according to claim 10, wherein the projection television further comprises:

a first screw hole provided to the inclined rib to be coupled with a screw; and a second screw hole provided to the connecting part, and placed coaxially with the first screw hole.

12. The projection television according to claim 11, further comprising:

a connecting protrusion formed on one of the inclined rib and the connecting bracket; and a connecting protrusion accommodating groove formed on the other of the inclined rib and the connecting bracket.

13. The projection television according to claim 9, wherein the projection television further comprises:

a first screw hole provided to the inclined rib to be coupled with a screw; and a second screw hole provided to the connecting part, and placed coaxially with the first screw hole.

14. The projection television according to claim 13, wherein the first supporter of the supporting bracket further comprises:

a screwdriver inserting hole placed to correspond to the first screw hole to allow a screwdriver to pass therethrough.

15. The projection television according to claim 1, further comprising:

a connecting protrusion formed on one of the inclined rib and the connecting bracket; and a connecting protrusion accommodating groove formed on the other of the inclined rib and the connecting bracket.

16. A projection television having a screen and a screen rear support assembly to support the screen, comprising:

a fixing bracket coupled with rear edge of the screen;

a supporting bracket connected to a rear of the fixing bracket and provided with an inclined rib, the inclined rib being seated on a rear of the fixing bracket; and a plurality of connecting brackets disposed around the fixing bracket to connect the supporting bracket and the fixing bracket.

17. The projection television according to claim 16, wherein the supporting bracket further comprises:

a first supporter disposed parallel to a surface of the screen;

a second supporter provided adjacent to the first supporter; and an inclined rib protruding from an inner surface of the second supporter.

18. The projection television according to claim 17, wherein the inclined rib further comprises:

an inclined surface inclined along a transverse direction to a rear surface of the screen and facing the rear surface of the screen;

an inserting slit formed along a lengthwise direction to allow insertion of an inserting part of the fixing bracket;

a first screw hole provided to the inclined rib and facing the first supporter; and a connecting protrusion spaced apart from the first screw hole to be inserted in a connecting protrusion accommodating groove of the plurality of connecting brackets.

19. The projection television according to claim 18, wherein the first supporter further comprises:

a screwdriver inserting hole placed corresponding to the first screw hole.

20. The projection television according to claim 18, wherein the fixing bracket further comprises:

a coupling part coupled with the rear edge of the screen;

a groove extending from the coupling part at an inclined angle corresponding to the inclined surface of the inclined rib and disposed between the contacting part and the inclined surface of the inclined rib; and an inserting part bent from an edge of the groove to be inserted into the inserting slit.

21. The projection television according to claim 17, wherein the inclined rib is provided in accordance with a direction of insertion of a screwdriver to prevent the screwdriver from moving forward to the screen.

22. The projection television according to claim 16, wherein the plurality of connecting brackets further comprises:

at least one contacting part to contact with the inclined surface of the inclined rib; and at least one connecting part bent from the contacting part towards a transverse direction to a surface of the second supporter.

23. The projection television according to claim 22, wherein the supporting bracket includes an inclined rib having a first screw hole provided to the inclined rib and wherein the at least one connecting part further comprises:

a second screw hole placed coaxially with the first screw hole of the inclined rib.

* * * * *

UNITED STATES PATENT AND TRADEMARK OFFICE
CERTIFICATE OF CORRECTION

| | | |
|---|---|---|
| PATENT NO. | : 7,403,333 B2 | Page 1 of 1 |
| APPLICATION NO. | : 10/822687 | |
| DATED | : July 22, 2008 | |
| INVENTOR(S) | : Hyung-sik Jang et al. | |

It is certified that error appears in the above-identified patent and that said Letters Patent is hereby corrected as shown below:

Column 6, Line 26, after "part" delete "to".

Signed and Sealed this

Twenty-first Day of October, 2008

JON W. DUDAS
*Director of the United States Patent and Trademark Office*